United States Patent
Pulicherla (10) Patent No.: US 9,148,306 B2
(45) Date of Patent: Sep. 29, 2015

(54) SYSTEM AND METHOD FOR CLASSIFICATION OF MEDIA IN VOIP SESSIONS WITH RTP SOURCE PROFILING/TAGGING

(71) Applicant: Avaya Inc., Basking Ridge, NJ (US)

(72) Inventor: Venki Reddy Pulicherla, Andhra Pradesh (IN)

(73) Assignee: Avaya Inc., Basking Ridge, NJ (US)

( * ) Notice: Subject to any disclaimer, the term of this patent is extended or adjusted under 35 U.S.C. 154(b) by 71 days.

(21) Appl. No.: 13/629,781

(22) Filed: Sep. 28, 2012

(65) Prior Publication Data

US 2014/0092783 A1    Apr. 3, 2014

(51) Int. Cl.
*H04L 12/16* (2006.01)
*H04L 12/64* (2006.01)
*H04L 29/06* (2006.01)

(52) U.S. Cl.
CPC ........... *H04L 12/6418* (2013.01); *H04L 65/608* (2013.01)

(58) Field of Classification Search
None
See application file for complete search history.

(56) References Cited

U.S. PATENT DOCUMENTS

| | | | | |
|---|---|---|---|---|
| 8,107,947 | B1 * | 1/2012 | Martin | 455/420 |
| 2002/0091834 | A1 * | 7/2002 | Isozu et al. | 709/227 |
| 2002/0136384 | A1 * | 9/2002 | McCormack et al. | 379/215.01 |
| 2003/0101049 | A1 * | 5/2003 | Lakaniemi et al. | 704/214 |
| 2003/0165136 | A1 * | 9/2003 | Cornelius et al. | 370/356 |
| 2003/0235184 | A1 * | 12/2003 | Dorenbosch et al. | 370/352 |
| 2004/0052259 | A1 * | 3/2004 | Garcia et al. | 370/392 |
| 2005/0030944 | A1 * | 2/2005 | Lazarus et al. | 370/389 |
| 2005/0049734 | A1 * | 3/2005 | Kim et al. | 700/94 |
| 2005/0276495 | A1 * | 12/2005 | Youm et al. | 382/243 |
| 2007/0153712 | A1 * | 7/2007 | Fry et al. | 370/263 |
| 2007/0172084 | A1 * | 7/2007 | Lee | 381/104 |
| 2007/0206592 | A1 * | 9/2007 | Itakura et al. | 370/389 |
| 2007/0263575 | A1 * | 11/2007 | Choe | 370/338 |
| 2007/0299939 | A1 * | 12/2007 | Johnston | 709/219 |
| 2008/0095345 | A1 * | 4/2008 | Sharma et al. | 379/201.01 |
| 2008/0310307 | A1 * | 12/2008 | Yeom | 370/235 |
| 2009/0086937 | A1 * | 4/2009 | Horn et al. | 379/88.13 |
| 2010/0023639 | A1 * | 1/2010 | Bowman | 709/231 |
| 2010/0024026 | A1 * | 1/2010 | Ylonen et al. | 726/12 |
| 2010/0067380 | A1 * | 3/2010 | Teng | 370/235 |
| 2010/0080328 | A1 * | 4/2010 | Johansson et al. | 375/346 |
| 2010/0138885 | A1 * | 6/2010 | Haimi-Cohen | 725/109 |
| 2010/0194847 | A1 * | 8/2010 | Halavy | 348/14.09 |
| 2012/0246301 | A1 * | 9/2012 | Vyrros et al. | 709/224 |
| 2012/0311329 | A1 * | 12/2012 | Medina et al. | 713/168 |
| 2012/0311686 | A1 * | 12/2012 | Medina et al. | 726/7 |
| 2013/0244614 | A1 * | 9/2013 | Santamaria et al. | 455/411 |
| 2014/0029477 | A1 * | 1/2014 | Suryavanshi et al. | 370/260 |

OTHER PUBLICATIONS

Network Working Group; Request for Comments: 3550; Obsoletes; 1889; Category; Standards Track; "RTP: A Transport Protocol for Real-Time Applications"; H. Schulzrinne; S. Casner; R. Frederick; V. Jackobson; Jul. 2003.

* cited by examiner

*Primary Examiner* — Otis L Thompson, Jr.
(74) *Attorney, Agent, or Firm* — Maldjian Law Group LLC (57) ABSTRACT

System and method to transmit an identification of a real-time transport protocol (RTP) data stream, the method including: identifying an identification of an RTP data stream; inserting the identification of the RTP data stream into an RTP header extension; and transmitting, by use of a network interface, an RTP packet comprising the RTP header extension. The method may further include: consulting a policy for profile tag settings, wherein the step of inserting the identification is dependent upon the policy.

16 Claims, 3 Drawing Sheets

SYSTEM AND METHOD FOR CLASSIFICATION OF MEDIA IN VOIP SESSIONS WITH RTP SOURCE PROFILING/TAGGING

BACKGROUND

1. Field of the Invention

Embodiments of the present invention generally relate to RTP media streams, and, in particular, to a system and method for controlling playback of an RTP media stream depending upon the source of the RTP media stream.

2. Description of Related Art

Multimedia Voice Over Internet Protocol ("VoIP") communication sessions may use the Real-Time Transport Protocol ("RTP") to transport the audio and/or video multimedia streams. An audio RTP multimedia stream may originate from different sources at different times during a VoIP call, and the audio from the different sources may have differing level of interest to a participant depending upon the source of the RTP multimedia stream. For example, in some server-based conferencing solutions, participants dial in to the conference server to join the conference. In some of these cases, a conference host may not be able to join the conference at a scheduled time due to a variety of potential problems (e.g., a technical problem, a network outage, other phone problems, etc.). Typically, a conference server plays music until the conference host joins the call.

Typically, participants of the conference call are not interested in listening to music while waiting on hold, so music typically has a low level of interest to most participants. However, participants may want to know when a host joins the conference, which may be indicated by a beep or other audible sound, or to know when the actual conversation starts. Currently, participants have to either listen to the music or have to keep the phone on a low volume level. If the participant is using a speakerphone, the music may be annoying to other nearby people.

If a VoIP session contains RTP streams from different sources, present solutions treat the RTP streams substantially the same, and apply a default action. The present solutions fail to provide a source-based classification of RTP, or to take action based on a class of RTP. For example, a participant may want to ignore RTP only from a music server but may want to be alerted when a conference host joins the call. The presently known solutions do not address this problem.

Therefore, a need exists to control playback of an RTP media stream depending upon its source or classification, in order to provide improved customer satisfaction.

SUMMARY

Embodiments in accordance with the present invention may provide a system and method to transmit an identification of a real-time transport protocol (RTP) data stream, the method including: identifying an identification of an RTP data stream; inserting the identification of the RTP data stream into an RTP header extension; and transmitting, by use of a network interface, an RTP packet comprising the RTP header extension. The method may further include: consulting a policy for profile tag settings, wherein the step of inserting the identification is dependent upon the policy.

A system in accordance with an embodiment of the present invention may provide transmission of an identification of a real-time transport protocol (RTP) data stream, the system including: an identification module configured to identify an RTP data stream; an insertion module configured to insert the identification of the RTP data stream into an RTP header extension; and a network interface configured to transmit an RTP packet comprising the RTP header extension. The system may further include a processor configured to consult a policy for profile tag settings, wherein the processor is configured to insert the identification depending upon the policy.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize identification of an RTP data stream.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical data storage medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol for call setup and control. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered UDP port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

Figure 1:
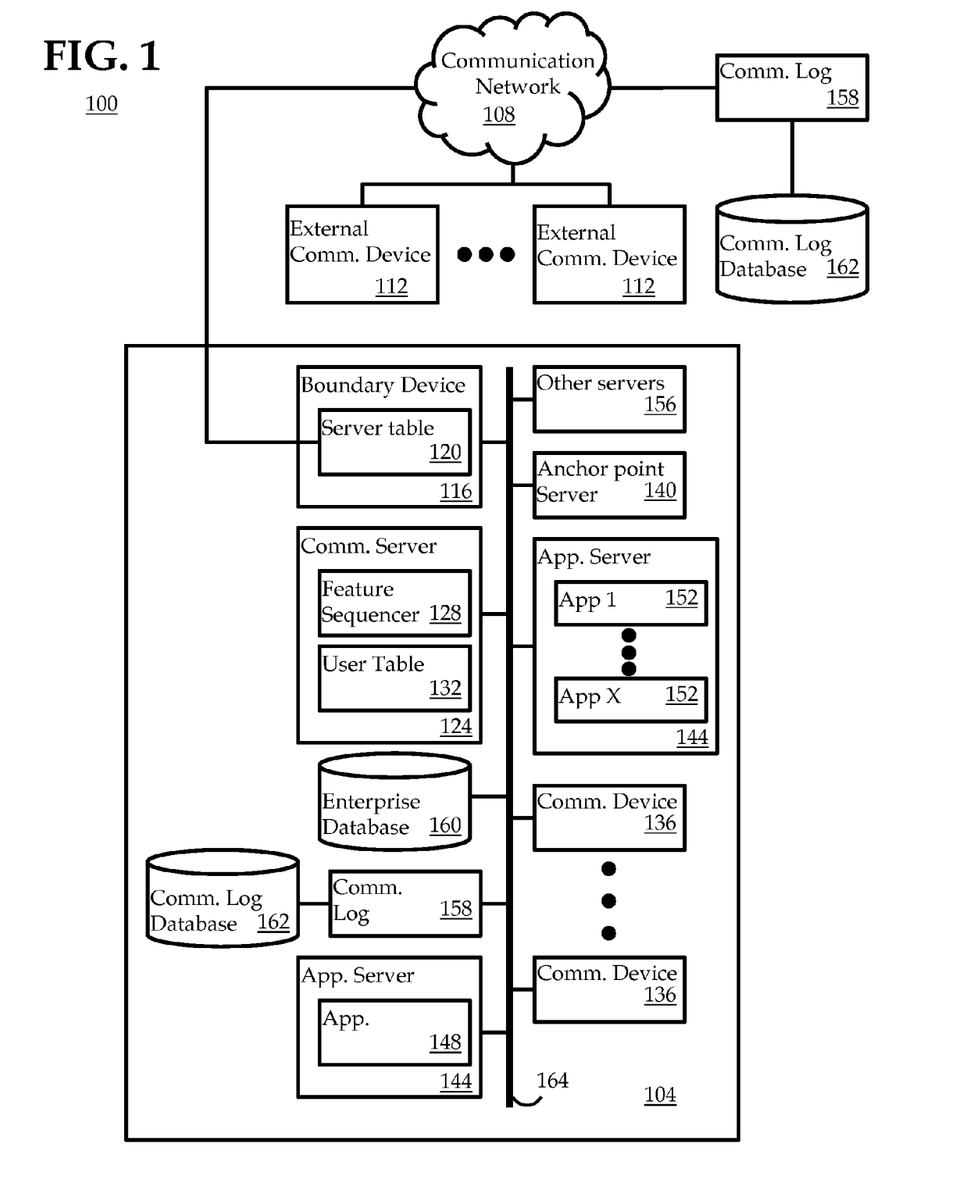
FIG. 1 is a block diagram depicting a system in accordance with an embodiment of the present invention.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multimedia communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

An audio multimedia data stream in VoIP sessions is typically transported using the RTP protocol. Embodiments in accordance with the present invention use a user-definable RTP source tagging mechanism in order to tag each RTP packet in the VoIP session with new tags ClassIdentifier, Name and Priority tags. Proprietary tags may be assigned names or values which are unlikely to conflict with usage of the tag field header by other unrelated entities for unrelated purposes.

The ClassIdentifier (or "ClassID") tag indicates the class of RTP data being transported. For example, a ClassID value of 0 (zero) may indicate that the RTP data source is a music server (e.g., server 144 of FIG. 1); a ClassID value of 1 (one) may indicate that the RTP data source is a user phone (e.g., external communication device 112 of FIG. 1), and so forth.

The Name and Priority tags indicate the source name of the RTP data stream, and the priority level of the RTP data, respectively. Source name may be substantially any name as long as the devices in the communication session are aware of the name and correctly interpret it. Source names may also be assigned commonly-agreed upon names for well known systems, such as music server, conferencing server etc. Participating devices may adhere to customary practice (e.g., RFCs, standards, etc.) when selecting and/or assigning tag values. Alternatively, participating devices may implement vendor-specific tag values that may provide a de facto standard for the characteristic and its value. Priority of the media sent by one party may be different than the priority of the media sent by other parties.

Embodiments in accordance with the present invention may practice that an RTP data source will insert a ClassIdentifier, Name and/or Priority tag into an RTP header extension of an RTP packet in order to indicate information about the source and/or class of data. The RTP packets so modified will then be transmitted to their destination by way of a network interface to a wide area network such as communication network 108 of FIG. 1. Alternatively, a server or router through which RTP data stream passes after the source may add the ClassIdentifier, Name and/or Priority tags if they are not already present in the RTP packet, or may modify their values. Embodiments may provide that a server other than the RTP data source may add or modify the tags. Substantially any device in the communication session may insert the tags. The tags may be predefined per communication solution or per vendor. An end terminal receiving the RTP packets (e.g., external communication device 112 of FIG. 1) may process each packet in accordance with a rule set up for the particular ClassIdentifier, Name and/or Priority tags.

Figure 2:
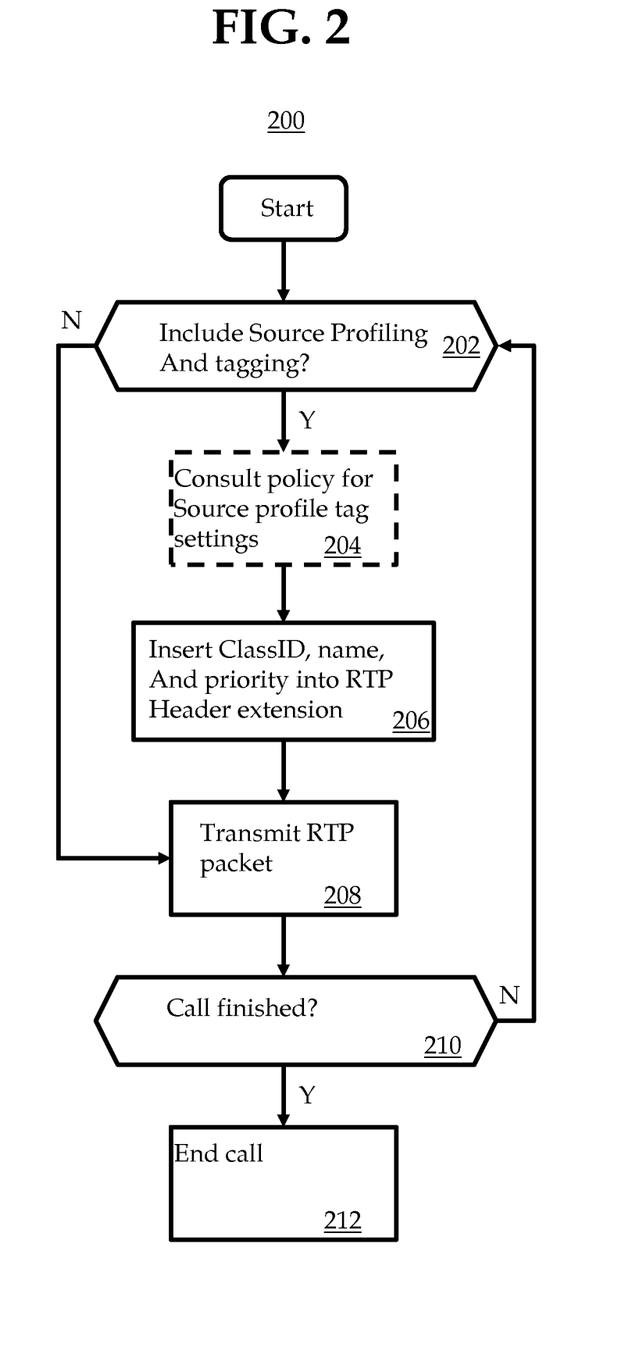
FIG. 2 illustrates a method of inserting an RTP header extension, in accordance with an embodiment of the present invention.

FIG. 2 illustrates method 200 to insert an RTP header extension in accordance with an embodiment of the present invention. Method 200 begins at step 202, at which a decision is made whether to include source profiling and tagging in the RTP header. There would be no tagging if the tagging has been disabled or if the RTP source is unknown. If the outcome of step 202 is negative, then method 200 proceeds directly to step 208 at which the RTP packet is transmitted without a header extension.

If the outcome of step 202 is affirmative, i.e., tagging is to be included in method 200, then control of method 200 passes to step 204 at which a policy may optionally be consulted to determine the desired tag settings for the present RTP data stream. Policy consultation may not be used if, for example there is no policy regarding profile tagging, or if the policy is consulted only in some circumstances such as when there is a change in the profile of the RTP data stream. Control of method 200 then proceeds to step 206.

At step 206, the ClassID, Name, and Priority tags are inserted into the RTP header extension. Control of method 200 then proceeds to step 208.

At step 208, the RTP packet is transmitted, either with or without a defined RTP header extension depending upon the outcome of step 202. Control of method 200 then proceeds to step 210.

At step 210 a decision is made whether the call is finished. If the call is not finished, then control of method 200 passes to step 202 in order to begin processing the next packet of the RTP media stream. If the outcome of step 210 is affirmative, then control of method 200 passes to step 212, at which the call is ended.

Figure 3:
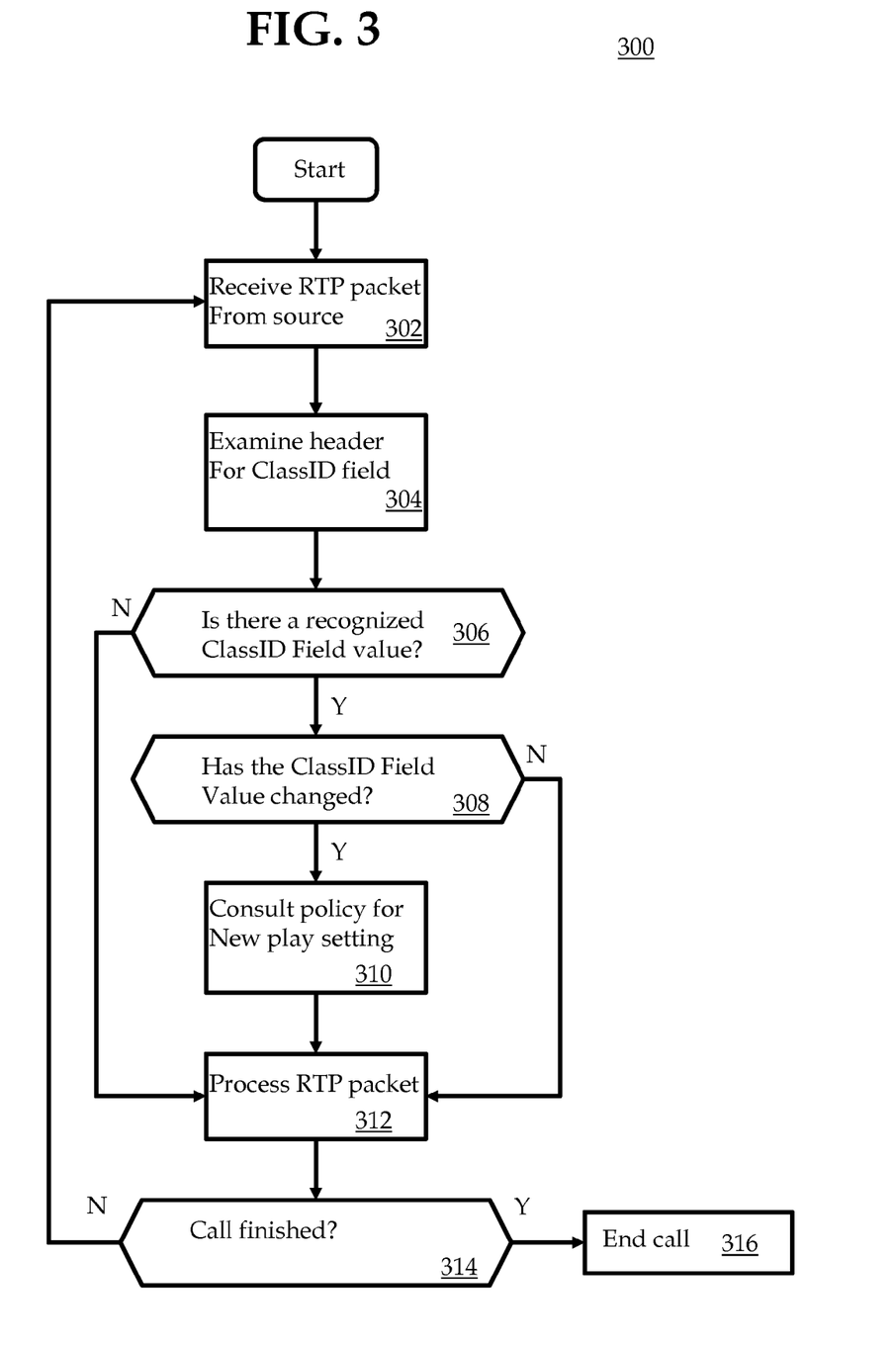
FIG. 3 illustrates a method of receiving and processing an RTP header extension, in accordance with an embodiment of the present invention.

FIG. 3 illustrates method 300 to process an RTP packet that may include an RTP header extension in accordance with an embodiment of the present invention. Method 300 begins at step 302, at which an RTP packet is received from a source. Control of method 300 then proceeds to step 304.

At step 304, the incoming RTP packet is examined to determine whether it includes a known RTP header extension in accordance with an embodiment of the present invention. This may include recognizing a predetermined ClassID field value or set of values. Step 304 may also search for a predetermined Name field value(s), and/or priority field value(s), either instead of or in addition to searching for the predetermined ClassID field value(s). Control of method 300 then proceeds to step 306.

At step 306, a decision is made whether the RTP packet included the predetermined ClassID field value(s), or predetermined Name field value(s), and/or priority field value(s). If the outcome of step 306 is negative, then control of method 300 passes to step 312. If the outcome of step 306 is positive, then control of method 300 passes to step 308.

By reason of method 300 executing step 308, the RTP packet has been determined to be in a format compatible with embodiments in accordance with the present invention. At step 308, a decision is made whether the ClassID field value, Name field value, and/or priority field value of the RTP packet header extension have changed since the previous RTP packet. If there has been no change to the header extension, there should be no change to the volume level or other characteristics of the RTP stream, and control of method 300 may pass to step 312. If there has been a change in the RTP header extension, then control of method 300 may pass to step 310.

At step 310, a policy may be consulted to determine the new play settings (e.g., volume level) for the new combination of the ClassID field value, Name field value, and/or priority field value of the RTP packet header extension. Control of method 300 then passes to step 312.

At step 312, the RTP packet is processed, including the effect of any play settings if an RTP header extension was detected and interpreted. Control of method 300 then passes to step 314.

At step 314, decision is made whether the call is finished. If the outcome of step 314 is affirmative, then control of method 300 passes to step 316 at which method 300 ends. If the outcome of step 314 is negative, then control of method 300 passes to step 302, at which method 300 is ready to receive and process the next RTP packet in the RTP media stream.

In an exemplary usage of embodiments in accordance with the present invention, a user may dial into a conference bridge number in order to participate in a conference call. Ordinarily during the conference call, at least the audio portion of a media stream may be transported from a conference server (e.g., server 144 of FIG. 1) to the users by use of the RTP protocol. However, if the host has not yet joined the conference when a particular user dials the bridge number to join the call, then the conference server may insert the output of a music server to be sent to the particular user as the audio media stream. The music server, operating in accordance with an embodiment of the present invention, starts to transmit a music RTP data stream with the RTP packets being tagged with a ClassIdentifier tag set to a predetermined value (e.g., "0"), and may also insert a name of the music server and a priority level for the RTP data stream (ordinarily a low priority in this situation).

At a user's receiving end, the user's smartphone or other intelligent end terminal may parse source tag information provided in RTP packets and present the tag information to the user, for the user to act upon. For example, a user's end terminal may display a message such as "Currently playing audio from Music Server. Do you want to ignore?" and present options of "Yes" and "No." A user may choose "Yes" to temporarily ignore or give less attention to audio from the music server, or "No" to continue receiving the RTP music stream with no change in priority, attention or handling, compared to an RTP media stream from the conference server.

Alternatively, a receiving user may pre-configure a source, name, and/or priority level to an a characteristic of the data stream, such as volume level for an audio data stream, or video quality for a video data stream. The pre-configuration may be by way of a user-configurable policy. When the receiving user receives an RTP data packet, the header may be examined for source, name, and priority tags. If any one of these tags is found, the policy may be consulted to determine a characteristic (e.g., volume level) desired by the receiving user for the detected source, name, and/or priority level. However, consulting the policy for each detected tag may impose a processing and/or memory access burden. Alternatively, the source, name, and/or priority level tag values for the present data stream may be stored in a memory with less access burden, e.g., a cache memory. Only if there is a change in one or more of the source, name, and/or priority tag levels from the levels stored in the cache memory will the policy be accessed to determine the new volume level or other new characteristic for the RTP data stream.

For an audio data stream, other characteristics that may be controllable may include sound quality level. For example, if the RTP Source tag indicates that a voice signal is being received, then a codec optimized for voice signals may be used, or a frequency spectrum may be tailored to a voice signal, etc. However, if the RTP Source tag indicates that a non-voice (e.g., music) signal is being received, the codec or frequency spectrum may be tailored to a non-voice signal. Embodiments in accordance with the present invention may be extended to video signals and defined priority levels.

Later, when the conference host joins the call, the conference server may discontinue inserting the output of the music server into the conference audio media stream, and may instead bridge together by way of a voice bridge of a conference server some or all of the connected users to form a composite audio media stream as the conference output. The conference server will provide different RTP tags for the RTP packets associated with the conference call, for instance providing a ClassIdentifier tag value of "1", and/or updated information for the conference Name and/or Priority tags. When the user's terminal receives the new RTP tag information, the terminal determines that the source of the RTP data stream has changed, and the terminal may present the user with a visual indication (e.g., a screen fluttering), an audio indication (e.g., a beep sound), a tactile indication (e.g., a vibration) or other kind of indication, so that the user can redirect their attention back to the conference and continue to actively participate in the conference session.

RTP tags may be implemented by way of an extension header format defined in RFC-3550, the content of which is incorporated herein in its entirety. The extension header format provides for payload-format-independent functions, not defined in RFC-3550, that require additional information to be carried in the RTP data packet header. The extension header format allows for customization of functions that are independent of the payload format. The extension header format also provides for backward compatibility, such that the extension header will be ignored if it is received by a device that does not implement embodiments in accordance with the present invention.

The RTP extension header format is shown below in Table 1.

TABLE 1

RTP extension header format

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      defined by profile       |           length              |
+-+-+-+-+-+-+-+-+-+-+-+-+-+-+-+-+-+-+-+-+-+-+-+-+-+-+-+-+-+-+-+-+
|                        header extension                       |
|                             ....                              |
```

Embodiments in accordance with the present invention may use the first 16 bits of the first 32-bit word to define the Source ClassIdentifier (e.g., "0" for a music server; "1" for a user phone; and so forth). The second 16 bits of the first 32-bit word are used to define a 16-bit length field that counts the number of 32-bit words in the header extension, excluding the first 32-bit word forming the profile and length. Embodiments may use one or more of the 32-bit words in the "header extension" to specify the source name and the priority value.

Other embodiments in accordance with the present invention may allow for a scenario in which a caller initially places a call but is then put on hold. The call may be, for example, a call to a contact center for support information regarding a product, or a call to a doctor's office, and so forth. After the call is answered, the agent may need to put the caller on hold for any number of reasons, for example if the agent needs to transfer the call, to consult a supervisor, to gather additional information, and so forth. Music may be played to the caller while the caller is on hold. An occasional recorded message may also be played, such as "Please continue to hold." The user may prefer to play the call on a speakerphone so that the caller does not have to hold a handset while waiting on hold. However, playing the call on the speakerphone at normal volume while the call is on hold risks annoying people who are near enough to hear it. The user may manually lower the volume while music is playing, with the intent of raising the volume to a normal level when the call is no longer on hold, but this is inconvenient and risks that the caller may not hear when the call is no longer on hold. In situation such as this, embodiments in accordance with the present invention may be helpful by permitting a caller to configure the caller's terminal such that the music and/or recorded messages while on hold will be played at a lower volume than live voice when not on hold.

Embodiments of the present invention include a system having one or more processing units coupled to one or more memories. The one or more memories may be configured to store software that, when executed by the one or more processing unit, allows insertion and/or processing of customized RTP header extensions, at least by use of processes described herein, including at least in FIGS. 2-3, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to transmit an identification of a real-time transport protocol (RTP) data stream, comprising:
    identifying a present identification of a profile tag of a source of an RTP data stream;
    detecting a change from a previous identification of the profile tag of the source of the RTP data stream to the present identification of the profile tag of the source of the RTP data stream;
    if said change is detected, perform the step of: consulting a policy for source profile tag settings;

inserting the identification of the profile tag of the source of the RTP data stream into an RTP header extension; and transmitting, by use of a network interface, an RTP packet comprising the RTP header extension;

wherein a playback characteristic of the RTP data stream is modifiable based upon the change in the identification of the profile tag of the source of the RTP data stream in the RTP header extension.

2. The method of claim 1, wherein the step of inserting the identification is dependent upon the policy.

3. The method of claim 1, wherein the identification comprises a source of the RTP data stream.

4. The method of claim 1, wherein the identification comprises a profile tag of the RTP data stream.

5. The method of claim 1, wherein the identification comprises a name of the RTP data stream.

6. The method of claim 1, wherein the identification comprises a priority of the RTP data stream.

7. A method to modify a playback characteristic of a real-time transport protocol (RTP) data stream, comprising:

receiving, by use of a network interface, an RTP data stream comprising an RTP header extension;

identifying a characteristic of the RTP data stream from the RTP header extension, wherein the characteristic comprises a profile tag of a source of the RTP data stream;

consulting a policy for source profile tag setting to determine a modification of the playback characteristic;

modifying the playback characteristic based upon an identification of the characteristic of the RTP data stream, wherein modifying the playback characteristic further comprises modifying the playback characteristic based upon a change in the identification of the source of the RTP data stream.

8. The method of claim 7, wherein the step of modifying the playback characteristic comprises lowering a volume level if a source of the RTP data stream comprises a music server.

9. The method of claim 7, wherein the step of modifying the playback characteristic comprises lowering a volume level if a source of the RTP data stream comprises a recorded message.

10. The method of claim 7, wherein the step of modifying the playback characteristic comprises substantially maintaining a lowered volume level if a source of the RTP data stream comprises a recorded message.

11. The method of claim 7, wherein the step of modifying the playback characteristic comprises raising a volume level if a source of the RTP data stream comprises a voice bridge of a conference server.

12. The method of claim 7, wherein the step of modifying the playback characteristic comprises modifying a playback quality of the RTP data stream.

13. The method of claim 7, further comprising:

presenting to a user the identification of the source of the RTP data stream; and obtaining user permission before modifying the playback characteristic.

14. The method of claim 7, wherein the step of modifying the playback characteristic further comprises: presenting a user indication of a modified playback characteristic.

15. A system to transmit an identification of a real-time transport protocol (RTP) data stream, comprising:

an identification module configured to identify a present identification of a profile tag of a source of an RTP data stream;

a detection module configured to detect a change from a previous identification of the profile tag of a source of the RTP data stream to the present identification of a profile tag of a source of the RTP data stream;

a processor configured to consult a policy for source profile tag settings if said change is detected;

an insertion module configured to insert the identification of the profile tag of the source of the RTP data stream into an RTP header extension; and a network interface configured to transmit an RTP packet comprising the RTP header extension;

wherein a playback characteristic of the RTP data stream is modifiable based upon the change in the identification of the profile tag of the source of the RTP data stream in the RTP header extension.

16. The system of claim 15, wherein the processor is configured to insert the identification depending upon the policy.

* * * * *